(12) United States Patent
Shimizu

(10) Patent No.: US 11,024,920 B2
(45) Date of Patent: Jun. 1, 2021

(54) BATTERY MODULE

(71) Applicant: Panasonic Intellectual Property Management Co., Ltd., Osaka (JP)

(72) Inventor: Keisuke Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 16/319,227

(22) PCT Filed: Aug. 2, 2017

(86) PCT No.: PCT/JP2017/027996
§ 371 (c)(1),
(2) Date: Jan. 18, 2019

(87) PCT Pub. No.: WO2018/037860
PCT Pub. Date: Mar. 1, 2018

(65) Prior Publication Data
US 2019/0280260 A1    Sep. 12, 2019

(30) Foreign Application Priority Data

Aug. 24, 2016 (JP) .............................. JP2016-163459

(51) Int. Cl.
*H01M 50/233* (2021.01)
*H01M 50/204* (2021.01)
*H01M 50/20* (2021.01)
*H01M 50/293* (2021.01)
*H01M 50/291* (2021.01)
*H01M 50/289* (2021.01)
(Continued)

(52) U.S. Cl.
CPC ....... *H01M 50/213* (2021.01); *H01M 10/643* (2015.04); *H01M 10/655* (2015.04); *H01M 10/658* (2015.04); *H01M 50/20* (2021.01)

(58) Field of Classification Search
None
See application file for complete search history.

(56) References Cited

U.S. PATENT DOCUMENTS

| 2013/0078494 | A1* | 3/2013 | Hermann | .......... H01M 10/4207 429/99 |
| 2013/0130084 | A1* | 5/2013 | Hamada | .............. H01M 10/617 429/99 |
| 2014/0045037 | A1* | 2/2014 | Nishikawa | .......... H01M 2/0277 429/156 |

FOREIGN PATENT DOCUMENTS

JP    2012-119136    6/2012

OTHER PUBLICATIONS

International Search Report of PCT application No. PCT/JP2017/027996 dated Oct. 10, 2017.

* cited by examiner

*Primary Examiner* — Yoshitoshi Takeuchi
(74) *Attorney, Agent, or Firm* — McDermott Will and Emery LLP

(57) ABSTRACT

A Battery module includes a plurality of cylindrical batteries and battery a holder holding the cylindrical batteries arranged in at least one row. The battery holder includes a first side wall part, a second side wall part, and a low thermal-conductive member disposed between the side wall parts. The low thermal-conductive member includes a first partition walls interposed between respective the cylindrical batteries and the first side wall part, and the second partition walls interposed between the respective cylindrical batteries (Continued)

and the second side wall part. The first and the second partition walls are alternately arrayed along the row.

5 Claims, 6 Drawing Sheets

(51) Int. Cl.
*H01M 50/22* (2021.01)
*H01M 50/218* (2021.01)
*H01M 2/10* (2006.01)
*H01M 10/643* (2014.01)
*H01M 10/653* (2014.01)
*H01M 50/213* (2021.01)
*H01M 10/655* (2014.01)
*H01M 10/658* (2014.01)

BATTERY MODULE

CROSS-REFERENCE TO RELATED APPLICATIONS

This application is a U.S. national stage application of the PCT International Application No. PCT/JP2017/027996 filed on Aug. 2, 2017, which claims the benefit of foreign priority of Japanese patent application No. 2016-163459 filed on Aug. 24, 2016, the contents all of which are incorporated herein by reference.

TECHNICAL FIELD

The present disclosure relates to a battery module.

BACKGROUND ART

A conventionally known battery module (as is disclosed in PTL 1) includes a plurality of cylindrical batteries and a battery holder having a plurality of battery containers to store the respective batteries. A battery module disclosed in PTL 1 is designed such that a battery holder has a thermal capacity that is higher at a middle of the holder than at outer sides of the holder to equalize temperatures of batteries stored in the battery holder.

CITATION LIST

Patent Literature

PTL 1: Unexamined Japanese Patent Publication No. 2012-119136

SUMMARY OF THE INVENTION

If one battery of cylindrical batteries stored in the battery holder abnormally generates heat, heat generated by the battery is presumably apt to be transmitted to a battery next to the abnormal battery among the other normal batteries, so that the neighboring battery as well abnormally generates heat due to the heat transfer. Thermal harm may extend sequentially in the module, resulting in infliction of thermal damage on a device or other equipment around the module.

A battery module according to the present disclosure includes a plurality of cylindrical batteries and a battery holder holding the cylindrical batteries arranged in at least one row. The battery holder includes a first side wall disposed at one side of the cylindrical batteries along the row of the batteries, a second side wall disposed at the other side of the cylindrical batteries along the row of the batteries, and a low thermal-conductive member disposed between the side walls. The low thermal-conductive member is lower in thermal conductivity than the side walls. The low thermal-conductive member includes a first partition wall interposed between a first side face of each of the cylindrical batteries and the first side wall, and a second partition wall interposed between a second side face of each of the cylindrical batteries and the second side wall. The first and the second partition walls are alternately arrayed along the row of the cylindrical batteries.

Even if a part of the batteries contained in the battery holder abnormally generates heat, the battery module according to the present disclosure can reduce an impact of the heat on the other normal batteries and satisfactorily avert sequential extension of thermal harm.

DESCRIPTION OF EMBODIMENT

Figure 1:
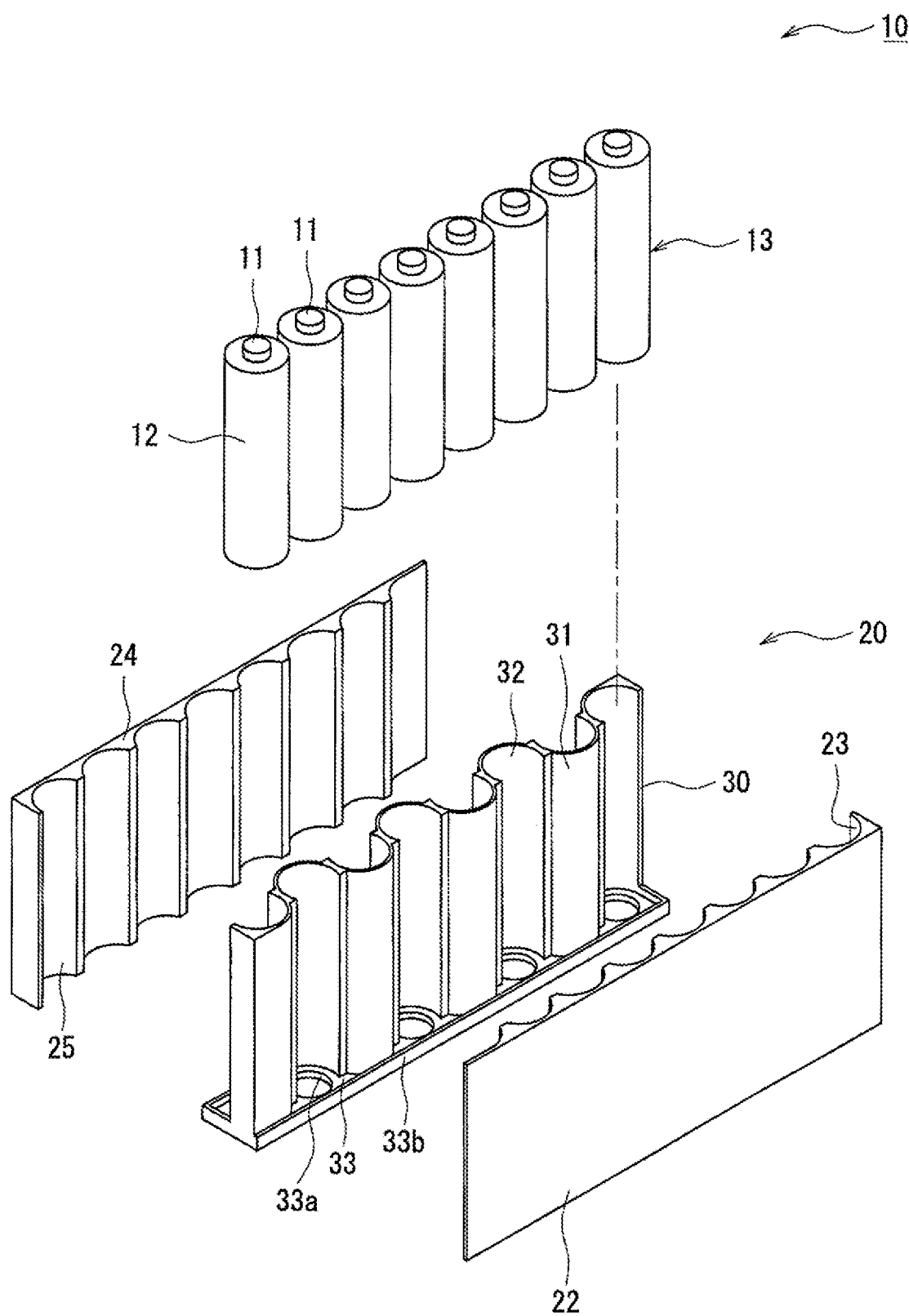
FIG. 1 is an exploded perspective view of a battery module according to an example of an exemplary embodiment.

As described above, a major challenge for a battery module incorporating a plurality of cylindrical batteries in a battery holder is to avert sequential extension of thermal harm in the event of abnormal heat generation by a part of the batteries. The inventors of the present disclosure have successfully solved the challenge with a battery holder having a low thermal-conductive member between two side walls. The low thermal-conductive member includes first partition walls and second partition walls alternately arrayed. In response to heat abnormally generated by a battery, a battery module including the battery holder makes the heat difficult to be transmitted to a battery next to the abnormal battery. A battery module according to an aspect of the present disclosure can satisfactorily avert sequential extension of thermal harm while ensuring satisfactory efficiency with which cylindrical batteries are incorporated.

If a battery in a battery holder of a conventional battery module abnormally generates heat, the heat is apt to be transmitted to a battery next to the abnormal battery and the heat is partly transmitted to the adjacent battery via a side wall of the battery holder (see FIG. 3B to be described later). The battery module according to the present disclosure can decrease the amount of heat transferred to a battery next to a battery that has abnormally generated heat. The decrease in the amount of heat transfer is implemented by the low thermal-conductive member as described above.

The low thermal-conductive member prevents adjacent batteries from coming into contact with an identical side wall of the battery holder. For example, concerning a first battery and a second battery that are adjacent to each other, the low thermal-conductive member hinders heat transfer between the first battery and a first side wall and hinders heat transfer between the second battery and a second side wall. Out of cylindrical batteries arranged in the battery holder, the alternate batteries are in contact with one of the first and the second side walls, for example. Even in the battery module according to an aspect of the present disclosure, in response to heat abnormally generated by a battery, the heat is transmitted to a battery next to the abnormal battery. Nevertheless, the low thermal-conductive member greatly hinders the transmission of heat to the adjacent battery via the side wall and thereby lowers concentration of heat on the adjacent battery. This configuration can satisfactorily avert a chain reaction of abnormal heat generation and resultant extension of thermal harm.

An example of a battery module according to an exemplary embodiment of the present disclosure will now be described in detail. However, the battery module according to the exemplary disclosure is not limited to the exemplary embodiment described below. Drawings referred to in a description of the exemplary embodiment are schematically drawn, and thus dimensions of configuration elements illustrated in the drawings should be understood in view of the following description. In the description herein, "substantially identical" means absolutely identical, as well as virtually identical, for example. Other words modified by "substantially" should be interpreted in the same manner.

Hereinafter, for the convenience of description, a direction in which a row of cylindrical batteries extends is referred to as a "lateral direction" of the battery module, and a direction in which a first side wall, a low thermal-conductive member, and a second side wall overlap is referred to as a "longitudinal direction" of the battery module. A direction along an axis of each cylindrical battery is referred to as a "vertical direction" of the battery module, and a side adjacent to a positive electrode terminal of the battery is referred to as "upper".

Figure 2:
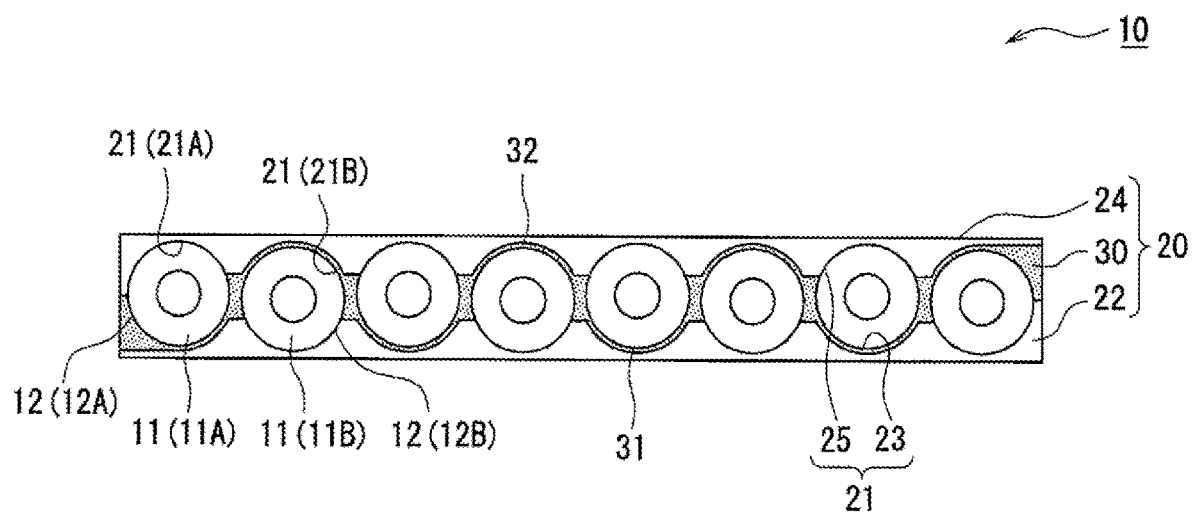
FIG. 2 is a plan view of the battery module according to the example of the exemplary embodiment.

FIG. 1 is a perspective view of battery module 10 according to an example of the exemplary embodiment, and FIG. 2 is a plan view of battery module 10. As exemplified in FIGS. 1 and 2, battery module 10 includes a plurality of cylindrical batteries 11 and battery holder 20 holding cylindrical batteries 11 arranged in at least one row. Battery holder 20 includes first side wall part 22 forming a first side wall, second side wall part 24 forming a second side wall, and low thermal-conductive member 30 that is lower in thermal conductivity than the side wall parts and that is disposed between the side wall parts. Low thermal-conductive member 30 includes first partition walls 31 interposed between respective cylindrical batteries 11 and first side wall part 22, and second partition walls 32 interposed between respective cylindrical batteries 11 and second side wall part 24. The first and the second partition walls are alternately arrayed along row 13 of cylindrical batteries 11.

Cylindrical battery 11 includes a metallic battery case and a power generation element contained in the battery case. The power generation element includes, for example, an electrode assembly with a winding structure and a non-aqueous electrolyte. The battery case is made up of a case main body formed in a bottomed cylindrical shape for the purpose of containing a power generation element and a sealing body sealing an opening of the case main body. Cylindrical battery 11 (the case main body) has side surface 12 that is curved across the case main body along the axis of the cylindrical battery. For example, the sealing body has a layered structure including a valve and a cap, and functions as a positive electrode terminal of cylindrical battery 11. A resin film is put on side surface 12 of the case main body to ensure insulation between cylindrical battery 11 and battery holder 20. In this example, an undersurface of the case main body constitutes a negative electrode terminal of the cylindrical battery.

Battery holder 20 has a structure in which the plurality of cylindrical batteries 11 forming row 13 is put between first side wall part 22 and second side wall part 24 in the longitudinal direction of the battery module. The structure of battery holder 20 putting cylindrical batteries 11 between the wall parts on both sides is maintained by fasteners (not shown) attached to the side wall parts or a case (not shown) containing the side wall parts, for example. First side wall part 22 and second side wall part 24 are disposed opposite to each other such that a plurality of containers 21 are formed between the side wall parts to contain respective cylindrical batteries 11. A length of battery holder 20 in the vertical direction is, for example, substantially equal to or may be shorter than a length of cylindrical battery 11 in the axis direction (the vertical direction).

A lead plate electrically connected to the positive electrode terminal of each cylindrical battery 11 is disposed above battery holder 20, and a positive-electrode current collector plate electrically connected to the lead plate is disposed over the lead plate, for example. A lead plate electrically connected to the negative electrode terminal of each cylindrical battery 11 is disposed below battery holder 20, and a negative-electrode current collector plate electrically connected to the lead plate is disposed over the lead plate, for example. Cylindrical batteries 11 contained in battery holder 20 are connected in parallel to the lead plates. Preferably, insulating boards each having a plurality of through holes are disposed between battery holder 20 and the respective lead plates such that the through holes expose the terminals of cylindrical batteries 11.

First side wall part 22 is disposed at one side of cylindrical batteries 11 along row 13. Second side wall part 24 is disposed at the other side of cylindrical batteries 11 along row 13. First and second side wall parts 22 and 24 are plate-shaped components that are laterally long and are disposed parallel with and opposite to each other so as to form side walls of battery holder 20. The side wall parts form the plurality of containers 21 to hold respective cylindrical batteries 11 and are configured to make temperature of cylindrical batteries 11 uniform, for example, during normal operation. In response to heat generated by any of the batteries, the side wall parts serve as heat radiators to diffuse that heat.

First and second side wall parts 22 and 24 may differ from each other in shape or size. However, the side wall parts may be identical parts in view of a reduction in a number of components or other benefits. For example, identical side wall parts may be disposed in different orientations. The side wall parts have respective recesses 23, 25 forming containers 21 and are disposed such that recesses 23, 25 face cylindrical batteries 11 (an inside of battery holder 20). An external surface of each of the side wall parts facing outward from battery holder 20 is a flat surface without projections or depressions.

Preferably, a plurality of recesses 23 is successively formed on an inside of first side wall part 22 in the lateral direction. Recess 23 is curved so as to convexly project in accordance with a shape of curved side surface 12 of cylindrical battery 11 and is formed throughout a length of first side wall part 22 in the vertical direction. Likewise, a plurality of recesses 25 similar to recesses 23 is formed on an inside of second side wall part 24. First and second side wall parts 22 and 24 are disposed opposite to each other such that respective recesses 23, 25 precisely overlap each other in the longitudinal direction. This forms the plurality of containers 21 arranged in one row in the lateral direction.

First side wall part 22 is partly in contact with alternate cylindrical batteries 11 along row 13 of cylindrical batteries 11. Meanwhile, second side wall part 24 is partly in contact with other alternate cylindrical batteries 11. In other words, second side wall part 24 is in contact with batteries that are not in contact with first side wall part 22, and every cylindrical battery 11 is in direct contact with one of the side wall parts. Specifically, every cylindrical battery 11 is not in direct contact with the other side wall part, but is connected with the other side wall part through low thermal-conductive member 30, as described later.

Preferably, the side wall parts are each formed from a material with high thermal conductivity. Examples of the preferable material include metals such as aluminum and aluminum alloys, ceramics such as aluminum nitride, and resins containing high thermal-conductive fillers. For example, the side wall parts are each formed of a metallic component in consideration of thermal conductivity, durability, workability, and other properties.

In battery holder 20, low thermal-conductive member 30 disposed between first and second side wall parts 22 and 24 prevents the side wall parts from coming into contact with each other. Lateral ends of the side wall parts may be in contact with each other. In the present exemplary embodiment, low thermal-conductive member 30 is always interposed between the side wall parts, for example.

As described above, low thermal-conductive member 30 includes first and second partition walls 31 and 32 alternately arrayed along row 13. Low thermal-conductive member 30 is interposed between each cylindrical battery 11 and any one of the side wall parts to prevent each cylindrical battery 11 from coming into contact, with any one of the side wall parts. Specifically; first partition walls 31 prevent a part of cylindrical batteries 11 from coming into contact with first side wall part 22. Meanwhile, second partition walls 32 prevent the remaining part of cylindrical batteries 11 from coming into contact with second side wall part 24. In other words, first and second partition walls 31 and 32 are alternately disposed in respective containers 21 in battery holder 20.

First partition walls 31 are disposed in the alternate containers along a row of containers 21. Similarly, second partition walls 32 are disposed in the alternate containers. Hereinafter, cylindrical battery 11 from which heat is hindered from transferring to first side wall part 22 by first partition wall 31 is referred to as "cylindrical battery 11A", and cylindrical battery 11 from which heat is hindered from transferring to second side wall part 24 by second partition wall 32 is referred to as "cylindrical battery 11B". Cylindrical batteries 11A, 11B are alternately disposed along the lateral direction. Low thermal-conductive member 30 prevents adjacent cylindrical batteries 11A, 11B from coming into contact with an identical side wall part. Because of the disposition of low thermal-conductive member 30, a center of cylindrical battery 11A, 11B is shifted off a center of each container 21. In other words, in containers 21 cylindrical batteries 11A are slightly shifted to second side wall part 24, and cylindrical batteries 11B are slightly shifted to first side wall part 22.

In low thermal-conductive member 30, first and second partition walls 31 and 32 constitute a contiguous waveform. First and second partition walls 31 and 32 are each a plate-shaped part that is curved along side surface 12 of cylindrical battery 11. However, the first and second partition walls are curved so as to convexly project in mutually opposite directions. First partition walls 31 are curved so as to convexly project toward first side wall part 22 and are disposed along recesses 23. Meanwhile, second partition walls 32 are curved so as to convexly project toward second side wall part 24 and are disposed along recesses 25. First and second partition walls 31 and 32 are connected to each other between cylindrical batteries 11A, 11B. Thus, low thermal-conductive member 30 has a waveform shape of regularly repeated projections and depressions.

In each container 21A containing cylindrical battery 11A, first partition wall 31 is, for example, in contact with side surface 12A of cylindrical battery 11A and recess 23 in first side wall part 22, with substantially no gap therebetween. In container 21A, cylindrical battery 11A is connected with first side wall part 22 through first partition wall 31. First partition wall 31 hinders heat transfer between cylindrical battery 11A and first side wall part 22. On the other hand, in container 21A, side surface 12A of cylindrical battery 11A is, for example, in contact with recess 25 in second side wall part 24, with substantially no gap therebetween. This satisfactorily ensures heat transfer between cylindrical battery 11A and second side wall part 24.

In each container 21B containing cylindrical battery 11B, second partition wall 32 is, for example, in contact with side surface 12B of cylindrical battery 11B and recess 25 in second side wall part 24, with substantially no gap therebetween. In container 21B, cylindrical battery 11B is connected with second side wall part 24 through second partition wall 32. Second partition wall 32 hinders heat transfer between cylindrical battery 11B and second side wall part 24. On the other hand, in container 21B, side surface 12B of cylindrical battery 11B is, for example, in contact with recess 23 in first side wall part 22, with substantially no gap therebetween. This satisfactorily ensures heat transfer between cylindrical battery 11B and first side wall part 22.

It is preferable that a face of first partition wall 31 in contact with first side wall part 22 is unevenly formed or roughened to increase resistance to thermal conduction between first partition wall 31 and first side wall part 22 and thereby reduce heat transfer between cylindrical battery 11B and first side wall part 22. At the same time, it is preferable that a face of second partition wall 32 in contact with second side wall part 24 is unevenly formed or roughened to increase resistance to thermal conduction between second partition wall 32 and second side wall part 24 and thereby reduce heat transfer between cylindrical battery 11B and second side wall part 24.

Low thermal-conductive member 30 has base part 33 to support a bottom surface of each cylindrical battery 11. Base part 33 extends inward (into containers 21) from a lower end of the partition walls so as to cover the bottom surfaces of cylindrical batteries 11 and abuts on, for example, a periphery of the bottom surface of each cylindrical battery 11. Base part 33 has openings 33a that are each formed to expose a middle of the bottom surface of cylindrical battery 11. The negative-electrode lead plate is disposed below battery holder 20, with an insulating board interposed therebetween. The bottom surface of each cylindrical battery 11 serves as a negative electrode terminal, and the lead plate is accessible to the bottom surfaces of cylindrical batteries 11 via openings 33a.

Base part 33 includes stand wall 33b formed so as to surround the lower end of the partition walls. In the present exemplary embodiment, first and second side wall parts 22 and 24 are put on stand wall 33b of base part 33. In other words, the side wall parts are supported by base part 33. The side wall parts are each shorter in length in the vertical direction than low thermal-conductive member 30. For example, when the side wall parts are put on stand wall 33b, upper ends of the parts and the member are at an identical level. Owing to the disposition of base part 33, low thermal-conductive member 30 can support cylindrical batteries 11 and the side wall parts, and provides improved strength.

Low thermal-conductive member 30 is satisfactory as long as the member has a thermal conductivity lower than the thermal conductivity of the side wall parts. Preferably, the low thermal-conductive member is a resin-made component. Low thermal-conductive member 30 is formed from a curable resin, for example. A preferred example of the curable resin is a resin having such a cross-linked structure as not to melt when being exposed to a temperature of 600° C. or higher and getting carbonized without melting to maintain shape of low thermal-conductive member 30 when being exposed to a high temperature ranging from 800° C. to 1,000° C. Specific examples of the resin include thermosetting resins including unsaturated polyester, an epoxy resin, a melamine resin, and a phenol resin. The curable resin forming low thermal-conductive member 30 may contain an endothermic filler. Endothermic fillers exhibit an endothermic action during thermal decomposition. Specific examples of the endothermic filler include aluminum hydroxide and sodium hydrogen carbonate.

Figure 3A:
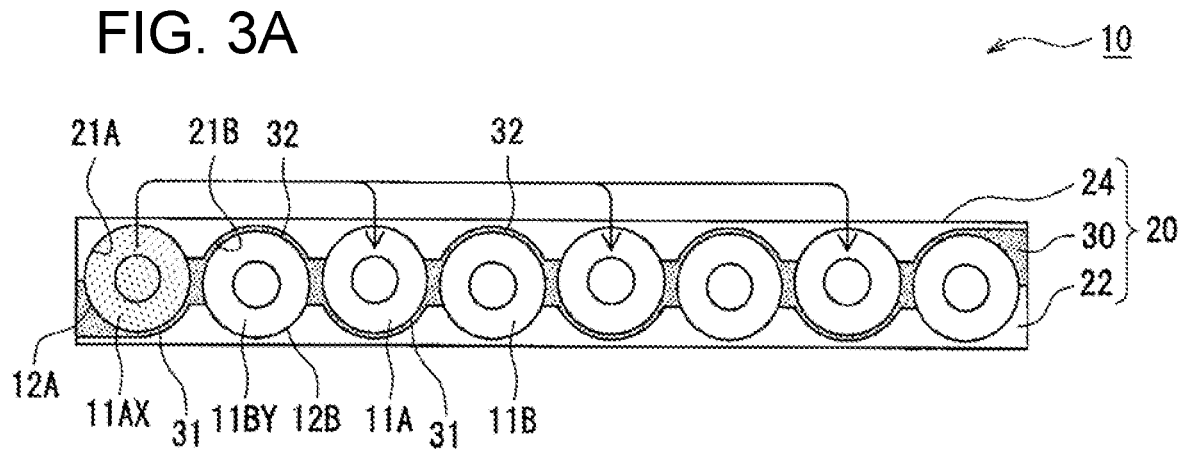
FIGS. 3A and 3B are made up of drawings illustrating a function performed by the battery module according to the example of the exemplary embodiment.
Figure 3B:
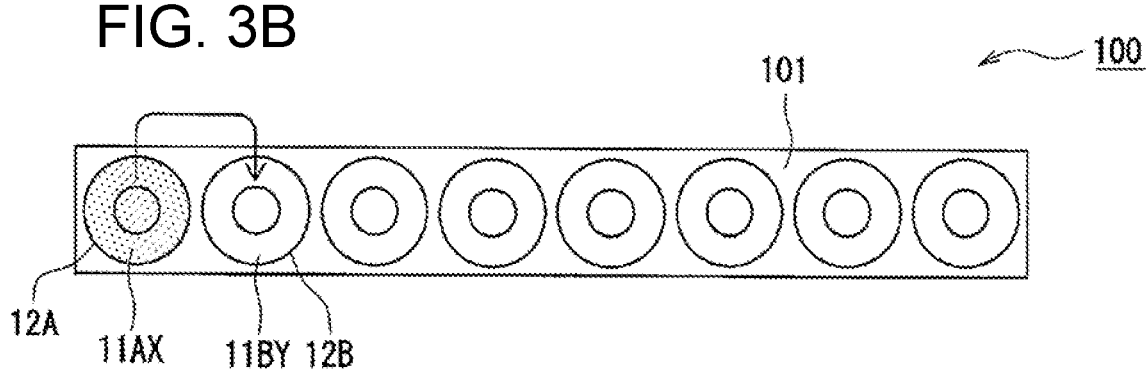

FIG. 3A is a drawing illustrating a function performed by battery module 10 having the above-described configuration and showing a situation in which cylindrical battery 11AX has abnormally generated heat. FIG. 3B is a drawing showing battery module 100 having battery holder 101 without low thermal-conductive member 30. In both battery modules 10, 100, heat abnormally generated by cylindrical battery 11AX is transferred to a nearest battery, i.e., adjacent cylindrical battery 11BY. Nevertheless, battery module 10 enables a substantial reduction in an amount of heat transferred to cylindrical battery 11BY as compared to battery module 100 and thus can reduce a thermal impact on cylindrical battery 11BY.

With reference to FIG. 3A, battery module 10 is configured such that low thermal-conductive member 30 prevents adjacent cylindrical batteries 11A, 11B from coming into direct contact with an identical side wall part. First partition wall 31 prevents cylindrical battery 11AX from coming into contact with first side wall part 22 while the cylindrical battery is in direct contact with second side wall part 24. Meanwhile, second partition wall 32 prevents cylindrical battery 11BY from coming into contact with second side wall part 24 while the cylindrical battery is in direct contact with first side wall part 22. This configuration allows heat to readily transfer from cylindrical battery 11AX to second side wall part 24, while heat is hard to transfer to cylindrical battery 11BY through second side wall part 24 because of second partition wall 32 interposed between cylindrical battery 11BY and second side wall part 24. Heat is hard to transfer from cylindrical battery 11AX to first side wall part 22, which cylindrical battery 11BY is in contact with.

Consequently, heat from cylindrical battery 11AX is diffused, for example, by second side wall part 24, which cylindrical battery 11BY is not in direct contact with. This lowers concentration of heat on cylindrical battery 11BY. In other words, this configuration hinders heat transferred from cylindrical battery 11AX from concentrating on cylindrical battery 11BY and thereby prevents cylindrical battery 11BY from abnormally generating heat. This averts sequential extension of thermal harm in the module. In battery holder 20, the partition walls of low thermal-conductive member 30 disposed in containers 21 are thin plate-shaped parts that do not occupy large space. This configuration enables battery module 10 to maintain satisfactory efficiency with which cylindrical batteries 11 are incorporated.

The exemplary embodiment described above may be appropriately changed in design without impairing the object of the present disclosure. The first side wall and the second side wall of the battery holder may be an integrated molding, for example, other than the separate parts. However, in this case as well, it is preferable that the first and the second side walls are connected only through both lateral ends of the battery holder or have a similar configuration and hence heat is hard to transfer between the side walls.

Figure 4:
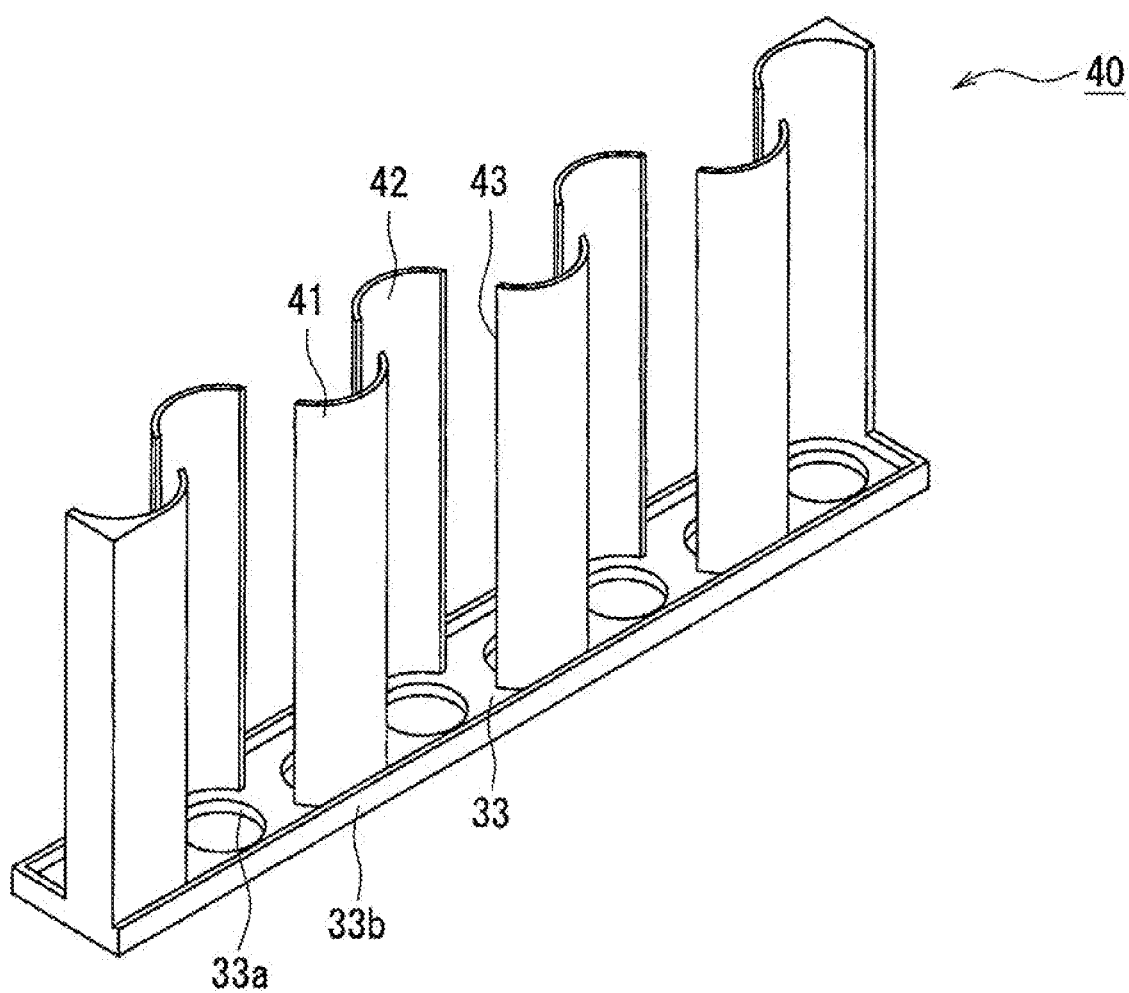
FIG. 4 is a perspective view of a low thermal-conductive member according to another example of the exemplary embodiment.
Figure 5:
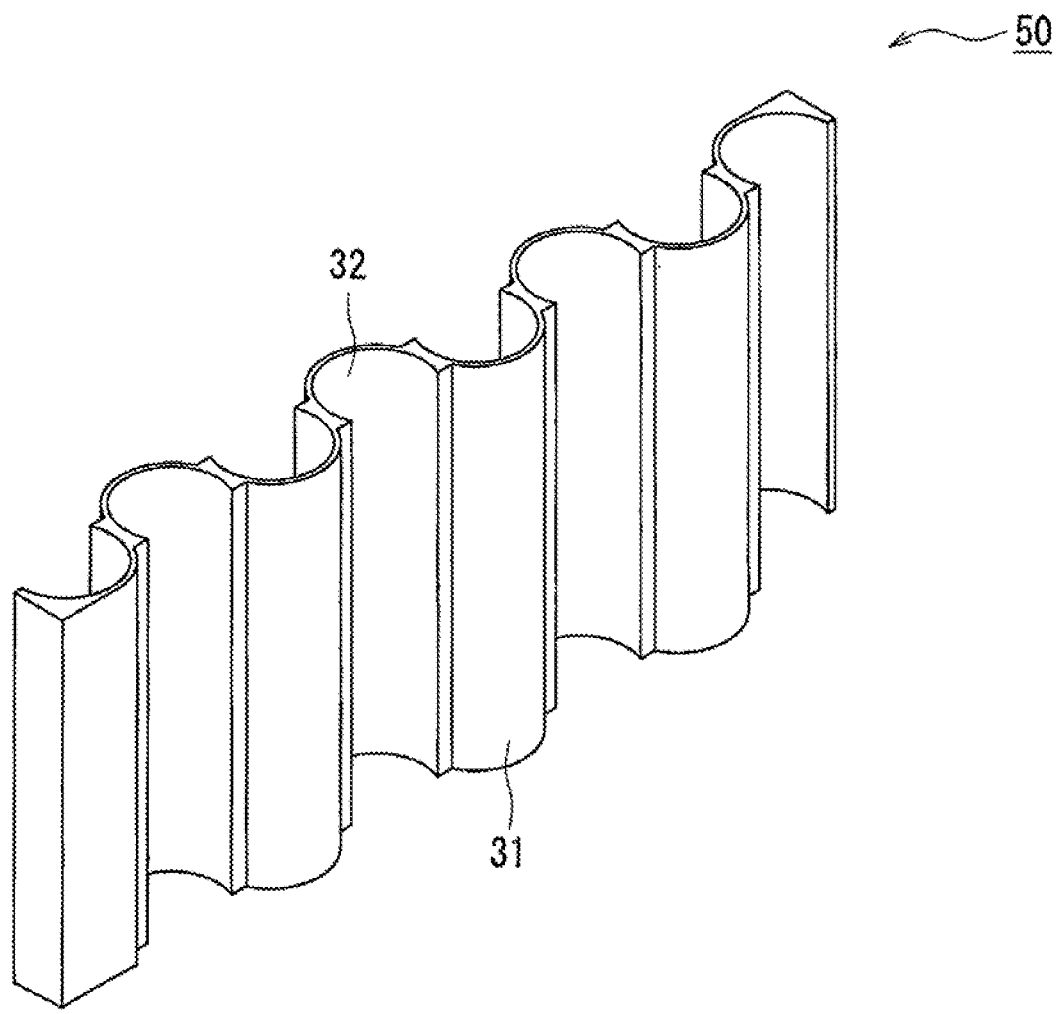
FIG. 5 is a perspective view of a low thermal-conductive member according to another example of the exemplary embodiment.
Figure 6:
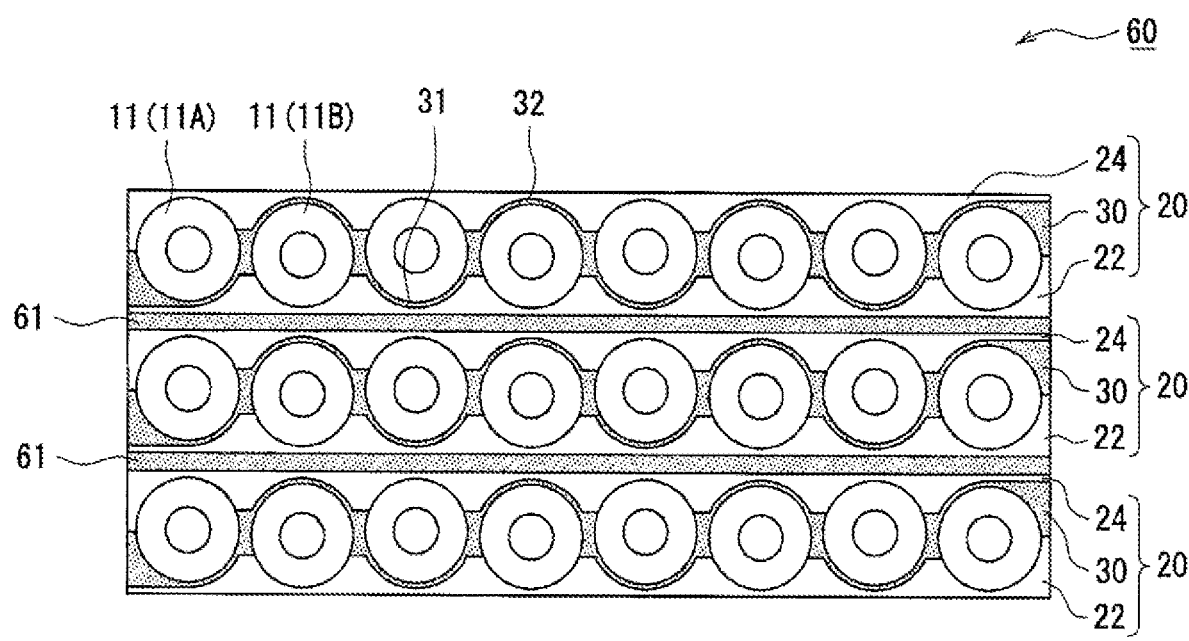
FIG. 6 is a plan view of a battery module according to another example of the exemplary embodiment.

FIGS. 4 to 6 each show a battery module or a low thermal-conductive member, a component of a battery module, according to another example of the exemplary embodiment. The following description is primarily given on differences between each modification and the exemplary embodiment described above. Components similar to those in the above-described exemplary embodiment are denoted by the same numerals or symbols, and redundant descriptions thereof will be omitted.

Low thermal-conductive member 40 exemplified in FIG. 4 is similar to low thermal-conductive member 30 in that first partition wall 41 and second partition wall 42 are alternately arrayed. On the other hand, low thermal-conductive member 40 differs from low thermal-conductive member 30 in that first and second partition walls 41 and 42 are not contiguous to each other and slit 43 is formed between the partition walls. Because of the disposition of slits 43, heat transfer through low thermal-conductive member 40 is reduced. While low thermal-conductive member 30 has a part between adjacent cylindrical batteries 11A, 11B (see FIG. 2) to join the partition walls to each other, low thermal-conductive member 40 has a gap (slit 43) between cylindrical batteries 11A, 11B and thus provides improved performance thermal insulation between the batteries. Since low thermal-conductive member 40 has base part 33, the partition walls act as one component without getting separated. In other words, the partition walls are joined by base part 33.

Low thermal-conductive member 50 exemplified in FIG. 5 does not have base part 33 and differs from low thermal-conductive member 30 in this respect. Low thermal-conductive member 50 includes first partition walls 31 and second partition walls 32 alternately arrayed. The partition walls constitute a contiguous waveform. If a battery holder includes low thermal-conductive member 50, a bottom surface of each cylindrical battery 11 is supported, for example, by another component such as an insulating board disposed below the battery holder.

Battery module 60 exemplified in FIG. 6 includes a plurality of battery holders 20 and differs from battery module 10 in this respect. Battery module 60 includes thin flat plate-shaped low thermal-conductive member 61 disposed between battery holders 20 to prevent first side wall part 22 of one of battery holders 20 from coming into contact with second side wall part 24 of the other of battery holders 20. In an example shown in FIG. 6, three battery holders 20 constitute the battery module. However, a number of the battery holders is not particularly limited to this example. A battery module may include two rows of cylindrical batteries 11, or may include four or more rows of cylindrical batteries 11.

An external surface of a battery holder includes a portion corresponding to a part between containers, and this portion may be recessed. In this case, on the external surface of the battery holder, a part corresponding to each of the containers forms a projection, and hence the external surface of the battery holder has projections and recesses. The battery holders adjacent to each other are disposed such that projections of one of the holders are put into recesses of the other holder. This configuration enables cylindrical batteries 11 to be disposed in a staggered manner (zigzag pattern).

The invention claimed is:
1. A battery module comprising:
(1) cylindrical batteries; and
(2) a battery holder holding the cylindrical batteries arranged and aligned in a row direction, the battery holder including:

(2a) a first side wall disposed at first sides of the cylindrical batteries along the row direction;
(2b) a second side wall disposed at second sides opposite to the first sides of the cylindrical batteries along the row direction; and
(2c) a low thermal-conductive member disposed between the first and second side walls, the low thermal-conductive member having a lower thermal conductivity than that of the first and second side walls, wherein:
the cylindrical batteries are grouped into a first group and a second group, and the cylindrical batteries in the first group and the cylindrical batteries in the second group are alternately arranged along the row direction,
the low thermal-conductive member includes first partition walls and second partition walls alternately arrayed along the row direction such that
the first partition walls are interposed between and in contact with the first sides of the cylindrical batteries of the first group and the first side wall, respectively, and
the second partition walls are interposed between and in contact with the second sides of the cylindrical batteries of the second group and the second side wall, respectively, and
the first side wall is in contact with the first sides of the cylindrical batteries in the second group, respectively, and
the second side wall is in contact with the second sides of the cylindrical batteries in the first group, and
the first partition walls and the second partition walls are connected by connection walls, respectively.

2. The battery module according to claim 1, wherein the first partition walls and the second partition walls in the low thermal-conductive member constitute a contiguous waveform.

3. The battery module according to claim 1, wherein the low thermal-conductive member is formed from a curable resin.

4. The battery module according to claim 1, wherein the first side wall and the second side wall are each formed of a metallic component.

5. The battery module according to claim 1, wherein the connection walls are aligned with the cylindrical batteries.

* * * * *